United States Patent [19]

Laviolette

[11] Patent Number: 5,365,883
[45] Date of Patent: Nov. 22, 1994

[54] CAT LITTER BOX APPARATUS

[76] Inventor: Michel Laviolette, 25 Grenville Street, Apt. 1804, Toronto, Ontario, Canada, M4Y 2X5

[21] Appl. No.: 127,177
[22] Filed: Sep. 27, 1993
[51] Int. Cl.$^5$ .............................................. A01K 29/00
[52] U.S. Cl. .................................................... 119/170
[58] Field of Search ............... 119/164, 165, 166, 167, 119/168, 169, 170

[56] References Cited

U.S. PATENT DOCUMENTS

| | | | |
|---|---|---|---|
| 3,100,474 | 8/1963 | Schneider | 119/166 |
| 3,908,597 | 9/1975 | Taylor | 119/166 |
| 4,027,625 | 6/1977 | Wheeler | 119/170 |
| 4,030,448 | 6/1977 | Nuttall | 119/165 |
| 4,593,645 | 6/1986 | Dingler | 119/165 |
| 4,886,014 | 12/1989 | Sheriff | 119/166 |

Primary Examiner—Gene Mancene
Assistant Examiner—Thomas Price

[57] ABSTRACT

A new and improved cat litter box apparatus includes a floor member and four walls projecting upward from the floor member. The four walls and the floor member define a container for litter material. A removable and replaceable cover member is capable of being fitted onto the four walls for sealing the litter within the container. A discharge outlet is located in one the four walls for permitting the litter within the container to be discharged from the container. Three of the four walls include grooves and one of the four walls includes a slot for receiving the cover member for sealing the litter within the container. A lifting handle is attached to one of the four walls for lifting the container. A receptacle slot, located under the floor member, receives the cover member when the cover member is not installed on the four walls for sealing the litter within the container. A spout member is capable of being connected to the discharge outlet for permitting controlled discharge of the litter from the container through the discharge outlet and through the spout member. A holder assembly is attached to one of the four walls for holding the spout member when the spout member is not connected to the discharge outlet. A discharge valve assembly is provided for selectively closing or opening the discharge outlet. A supply assembly may be provided for retaining a roll of film material for providing film material to the container.

8 Claims, 3 Drawing Sheets

CAT LITTER BOX APPARATUS

BACKGROUND OF THE INVENTION

1. Field of the Invention

The present invention relates generally to devices for disposing of pet wastes, and more particularly to devices for disposing of cat litter.

2. Description of the Prior Art

Cats that are kept as house pets generally have litter boxes for receiving their bodily wastes. Periodically, after accumulating a quantity of wastes, the contaminated litter must be disposed of and replaced. Disposing of contaminated litter can be quite a dirty and smelly task.

Throughout the years, a number of innovations have been developed relating to reducing the unpleasantness and unsanitariness of waste litter disposal. The following U.S. Pats. are representative of some of those innovations: 4,616,598; 4,844,011; 4,934,317; 4,986,217; and 5,014,649. More specifically, U.S. Pat. No. 4,616,598 a litter box that includes a screen for separating lumps of waste from granules of litter. The separated litter granules can then be recycled or used again. Because many people do not want to bother to separate lumps of waste from litter granules and because litter granules separated from lumps of waste may still be contaminated and smelly due to absorption of liquid wastes, it would be desirable if cat litter box apparatus were provided that did not have provisions for separating lumps of animal waste from litter granules. In addition, it would be desirable if a cat litter box apparatus were provided that did not have provisions for recycling or reusing waste contaminated cat litter.

U.S. Pat. No. 4,844,011 discloses a cat waste disposal system that has cat litter present at three vertical levels: in a topmost storage hopper for fresh litter; at an intermediate level below the hopper where the litter is used by the cat; and at a lowermost level, below the intermediate level to receive waste contaminated litter from the intermediate level. A motorized conveyer belt is used to move waste contaminated litter from the intermediate level to a chute that leads to the lowermost level which includes a bag from receiving waste litter. The system is very complex, very large, and would be difficult to clean. In this respect, it would be desirable if a litter disposal device were provided which is simple, small, and easy to clean.

U.S. Pat. No. 4,934,317 discloses a litter box that has a region for storing fresh litter, a region where the litter is used by the animal, and a region for receiving dumped contaminated litter. A mechanical scraper is provided for scraping waste contaminated litter into a bag for receiving dumped litter. The mechanical scraper operates by a pivoted lever action. The system disclosed in this patent is relatively complex, relatively large, and would be difficult to clean. More specifically, invariably when a scraper scrapes a surface, material is missed by the scraper and left as a residue on the surface. The residue is especially susceptible to being a site for putrification and unpleasant odor production. In this respect, it would be desirable if a litter disposal device were provided which precludes leaving a residue left by incomplete waste removal by a scraper.

To avoid problems associated with cleaning waste litter out of a box and to avoid problems associated with cleaning a litter box, U.S. Pat. No. 4,986,217 discloses a disposable litter box with which both the contaminated litter and the box itself are disposed of. This type of system is relatively expensive to use because of the constant need to replace the litter box. In this respect, it would be desirable if a litter disposal device were provided which did not dispose of the litter box along with contaminated waste litter. Disposal of the litter box also creates another problem. This problem is increased amounts of material that is picked up in garbage collection and sent to a landfill. In this respect, it would be desirable if a litter disposal device were provided which minimizes the amount of material that is picked up in garbage collection and that is sent to a landfill.

U.S. Pat. No. 5,014,649 discloses another disposable cat litter box. This box employs two collapsible walls that are made from foldable panels. The use of foldable panels requires more material than rigid panels. Moreover, to manufacture a structure that employs foldable panels may require more complex manufacturing techniques than manufacturing a structure that employs only rigid panels. In this respect, it would be desirable if a litter disposal device were provided which does not employ foldable panels.

Still other features would be desirable in a cat litter box apparatus. For example, when the litter box is available to the cat, the box should be open. However, when the box is lifted for transport for emptying out of the contaminated litter, the box should be readily closed to retain the waste litter and the confine unpleasant odors to the interior of the closed box.

Preferably, a cat litter box should have a capability of pouring waste litter out of the box in a small volume stream, in contrast with dumping the entire load of litter out of the box at once. A small volume stream can be directed into a waste litter receiver that has a small volume opening. Such a small volume opening permits less escape of dust and less escape of offensive odors.

In transferring a stream of material from a litter box to a waste litter receiver, it would be desirable if a spout could be attached to the litter box to facilitate the litter transfer. When litter transfer is not taking place, it would be desirable if a spout could be readily detached from the litter box and stored on the litter box for future use.

Since a litter box should be readily transportable to a waste receiver, it would be desirable if the litter box included a handle for carrying the litter box.

Thus, while the foregoing body of prior art indicates it to be well known to use cat litter boxes, the prior art described above does not teach or suggest a cat litter box apparatus which has the following combination of desirable features: (1) does not have provisions for separating lumps of animal waste from litter granules; (2) does not have provisions for recycling or reusing waste contaminated cat litter; (3) is simple, small, and easy to clean; (4) precludes leaving a residue left by incomplete waste removal by a scraper; (5) does not dispose of the litter box along with contaminated waste litter; (6) minimizes the amount of material that is picked up in garbage collection and that is sent to a landfill; (7) does not employ foldable panels; (8) is readily closed to retain the waste litter and to confine unpleasant odors to the interior of the closed box; (9) has a capability of pouring waste litter out of the box in a small volume stream, in contrast with dumping the entire load of litter out of the box at once; (10) has a spout that can be attached to the litter box to facilitate the transfer of waste litter; (11) has a spout that can be readily detached from the litter box and stored on the litter box for future use; and (12) includes a handle for carrying the litter box. The foregoing desired characteristics are provided by the unique cat litter box apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved cat litter box apparatus which includes a floor member and four walls projecting upward from the floor member. The four walls includes a first wall, a second wall, a third wall, and a fourth wall. The four walls and the floor member define a container for litter material. A removable and replaceable cover member is capable of being fitted onto the four walls for sealing the litter within the container. A discharge outlet is located in one the four walls for permitting the litter within the container to be discharged from the container. Three of the four walls include grooves and one of the walls includes a slot for receiving the cover member for sealing the litter within the container. A lifting handle is attached to one of the four walls for lifting the container.

A receptacle slot receives the cover member when the cover member is not installed on the four walls for sealing the litter within the container. The receptacle slot is located below the floor member. A spout member is capable of being connected to the discharge outlet for permitting controlled discharge of the litter from the container through the discharge outlet and through the spout member. The spout member includes threads capable of connecting to complementary threads in the discharge outlet.

A holder assembly is attached to one of the four walls for holding the spout member when the spout member is not connected to the discharge outlet.

A discharge valve assembly is provided for selectively closing or opening the discharge outlet. The discharge outlet located in the first wall. The discharge valve assembly includes a slot in the first wall. The slot is located adjacent to the discharge outlet. A valve member is capable of sliding within the slot and is capable of being placed in registration with the discharge outlet for selectively controlling flow of the litter through the discharge outlet.

A supply assembly may be provided for retaining a roll of film material for providing film material to the container. The supply assembly includes a support bracket assembly supported by one of the four walls. An axle member is supported by the support bracket assembly. The axle member supports a roll of film material.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved cat litter box apparatus which has all of the advantages of the prior art and none of the disadvantages.

It is another object of the present invention to provide a new and improved cat litter box apparatus which may be easily and efficiently manufactured and marketed.

It is a further object of the present invention to provide a new and improved cat litter box apparatus which is of durable and reliable construction.

An even further object of the present invention is to provide a new and improved cat litter box apparatus which is susceptible of a low cost of manufacture with regard to both materials and labor, and which accordingly is then susceptible of low prices of sale to the consuming public, thereby making such cat litter box apparatus available to the buying public.

Still yet a further object of the present invention is to provide a new and improved cat litter box apparatus which does not have provisions for separating lumps of animal waste from litter granules.

Still another object of the present invention is to provide a new and improved cat litter box apparatus that does not have provisions for recycling or reusing waste contaminated cat litter.

Yet another object of the present invention is to provide a new and improved cat litter box apparatus which is simple, small, and easy to clean.

Even another object of the present invention is to provide a new and improved cat litter box apparatus that precludes leaving a residue left by incomplete waste removal by a scraper.

Still a further object of the present invention is to provide a new and improved cat litter box apparatus which does not dispose of the litter box along with contaminated waste litter.

Yet another object of the present invention is to provide a new and improved cat litter box apparatus that minimizes the amount of material that is picked up in garbage collection and that is sent to a landfill.

Still another object of the present invention is to provide a new and improved cat litter box apparatus which does not employ foldable panels.

Yet another object of the present invention is to provide a new and improved cat litter box apparatus that is readily closed to retain the waste litter and to confine unpleasant odors to the interior of the closed box.

Still a further object of the present invention is to provide a new and improved cat litter box apparatus that has a capability of pouring waste litter out of the box in a small volume stream, in contrast with dumping the entire load of litter out of the box at once.

Yet another object of the present invention is to provide a new and improved cat litter box apparatus which has a spout that can be attached to the litter box to facilitate the transfer of waste litter.

Still a further object of the present invention is to provide a new and improved cat litter box apparatus that has a spout that can be readily detached from the litter box and stored on the litter box for future use.

Yet another object of the present invention is to provide a new and improved cat litter box apparatus which includes a handle for carrying the litter box.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawing and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved cat litter box apparatus embodying the principles and concepts of the present invention will be described.

Figure 1:
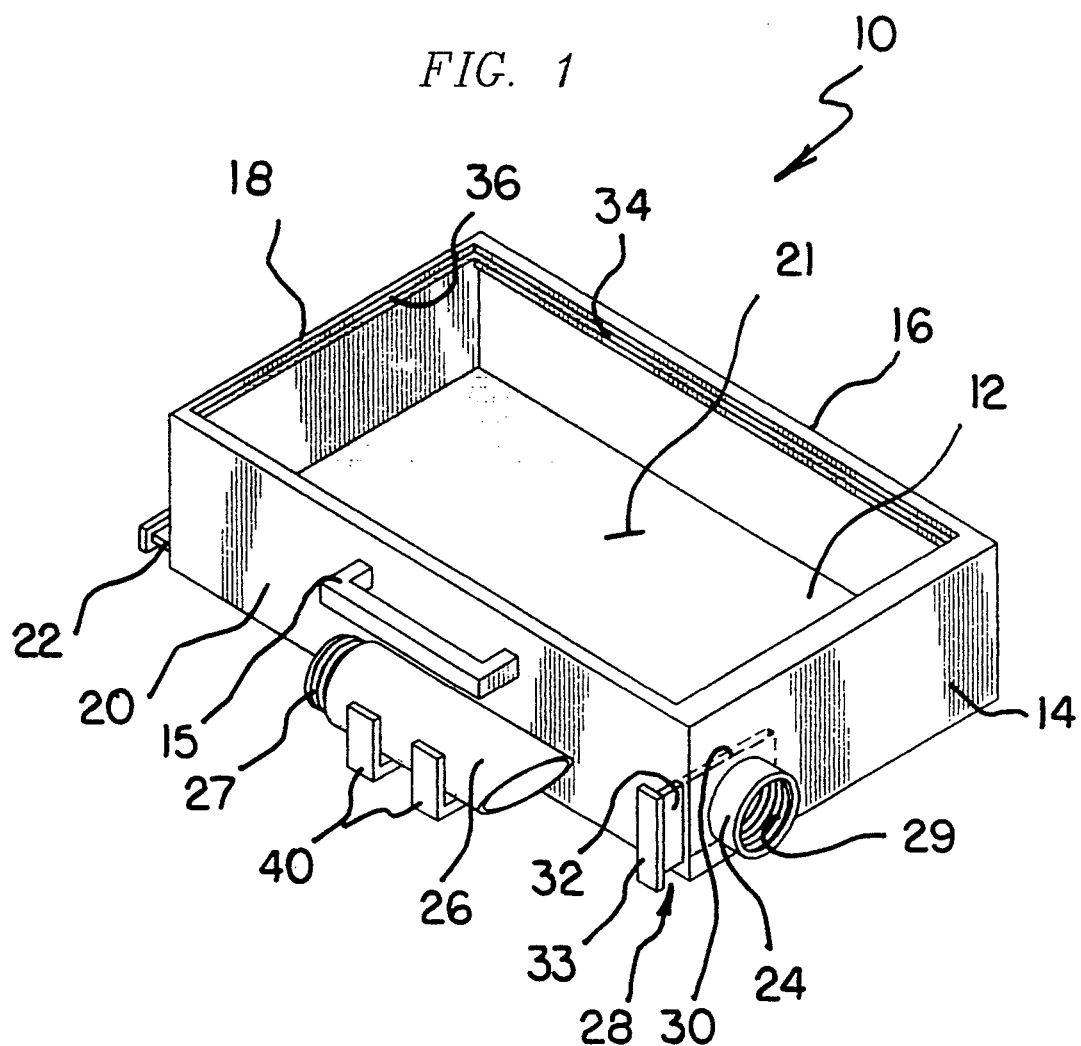
FIG. 1 is a perspective view showing a first preferred embodiment of the cat litter box apparatus of the invention wherein the box is open and the spout is not connected to a discharge opening.
Figure 2:
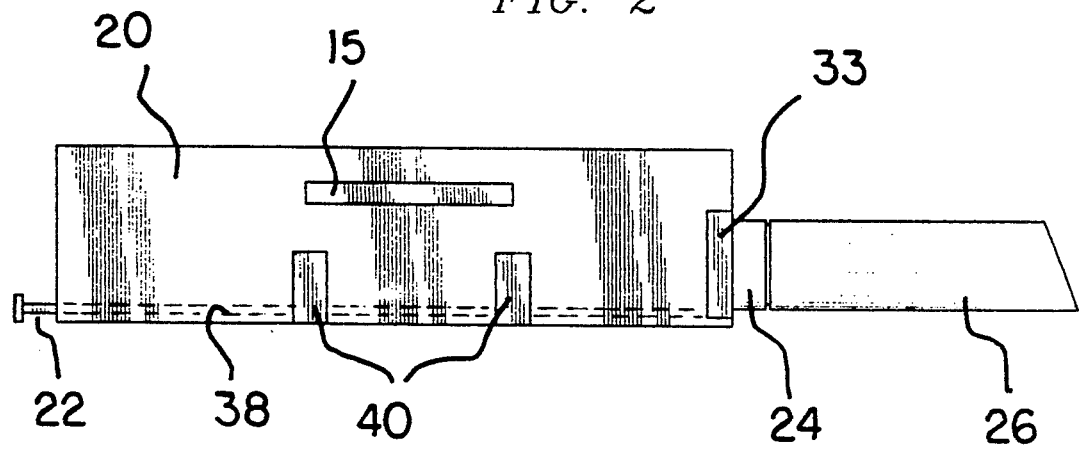
FIG. 2 is a side view of the open cat litter box apparatus shown in FIG. 1 with the spout connected to the discharge opening.
Figure 3:
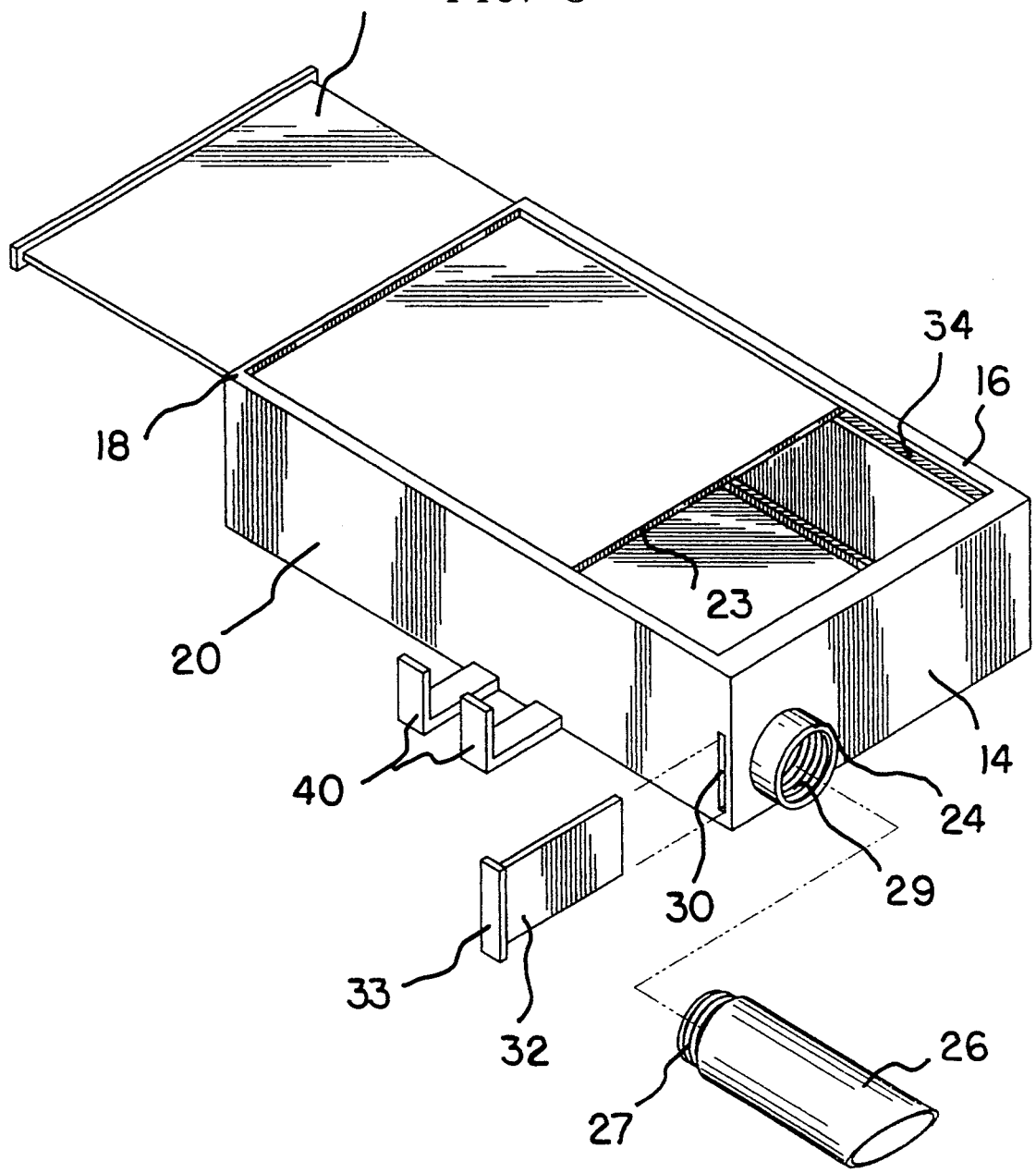
FIG. 3 is an exploded perspective view of the cat litter box apparatus shown in FIG. 1 with the lid partially installed to partially close the box.

Turning initially to FIGS. 1-3, there is shown a first exemplary embodiment of the cat litter box apparatus of the invention generally designated by reference numeral 10. In its preferred form, cat litter box apparatus 10 includes a floor member 12 and four walls projecting upward from the floor member 12. The four walls include a first wall 14, a second wall 16, a third wall 18, and a fourth wall 20. The four walls and the floor member 12 define a container 21 for litter material (not shown). A removable and replaceable cover member 22 is capable of being tilted onto the four walls for sealing the litter within the container 21. A discharge outlet 24 is located in one the four walls for permitting the litter within the container 21 to be discharged from the container 21. Three of the four walls include grooves 34 and one of the four walls includes a slot 36 for receiving the cover member 22 for sealing the litter within the container 21. A lifting handle 15 is attached to one of the four walls for lifting the container 21.

A receptacle slot 38 receives the cover member 22 when the cover member 22 is not installed on the four walls for sealing the litter within the container 21. The receptacle slot 38 is located below the floor member 12. A spout member 26 is capable of being connected to the discharge outlet 24 for permitting controlled discharge of the litter from the container 21 through the discharge outlet 24 and through the spout member 26. The spout member 26 includes threads 27 capable of connecting to complementary threads 29 in the discharge outlet 24.

A holder assembly 40 is attached to one of the four walls for holding the spout member 26 when the spout member 26 is not connected to the discharge outlet 24. The holder assembly 40 includes two L-shaped brackets.

A discharge valve assembly 28 is provided for selectively closing or opening discharge outlet 24. The discharge outlet 24 located in the first wall 14. The discharge valve assembly 28 includes a slot 30 in the first wall 14. The slot 30 is located adjacent to the discharge outlet 24. A valve member 32 is capable of sliding within the slot 30 and is capable of being placed in registration with the discharge outlet 24 for selectively controlling flow of the litter through the discharge outlet 24. A handle 33 is provided for the valve member 32.

In use, the cover member 22 is left off of the four walls to expose the litter material to use by the cat as in a conventional litter box. When the cat litter box apparatus of the invention is about to be emptied, the following procedure is employed. The cover member 22 is removed from the receptacle slot 38 and placed through the slot 36 in the third wall 18. The cover member 22 is slided along the grooves 34 in the second wall 16 and the third wall 18. The leading edge 23 of the cover member 22 is moved into the groove 34 in the first wall 14.

In this way, a good seal is obtained between the cover member 22 and the four walls.

The spout member 26 is removed from the holder assembly 40, and the threads 27 are screwed into the threads 29 on the discharge outlet 24 whereby the spout member 26 is attached to the discharge outlet 24. A lifting handle 15 is used to carry the cat litter box apparatus of the invention to a place for disposal of the waste litter. While holding the cat litter box apparatus of the invention by the lifting handle 15, a user moves the valve member 32 away from the discharge outlet 24 thereby permitting waste litter to exit from the container 21 through the discharge outlet 24 and the spout member 26.

After the waste litter is discharged, the apparatus can be cleaned before the cover member 22 is removed from the grooves 34 in the walls and placed back into the receptacle slot 38 so that fresh litter material can be added to the container 21. The valve member 32 is also pushed back into position for closing the discharge outlet 24. The spout member 26 is unscrewed and placed back on the holder assembly 40. If desired, the floor member 12 can also be attached to the four walls by grooves in the walls.

Figure 4:
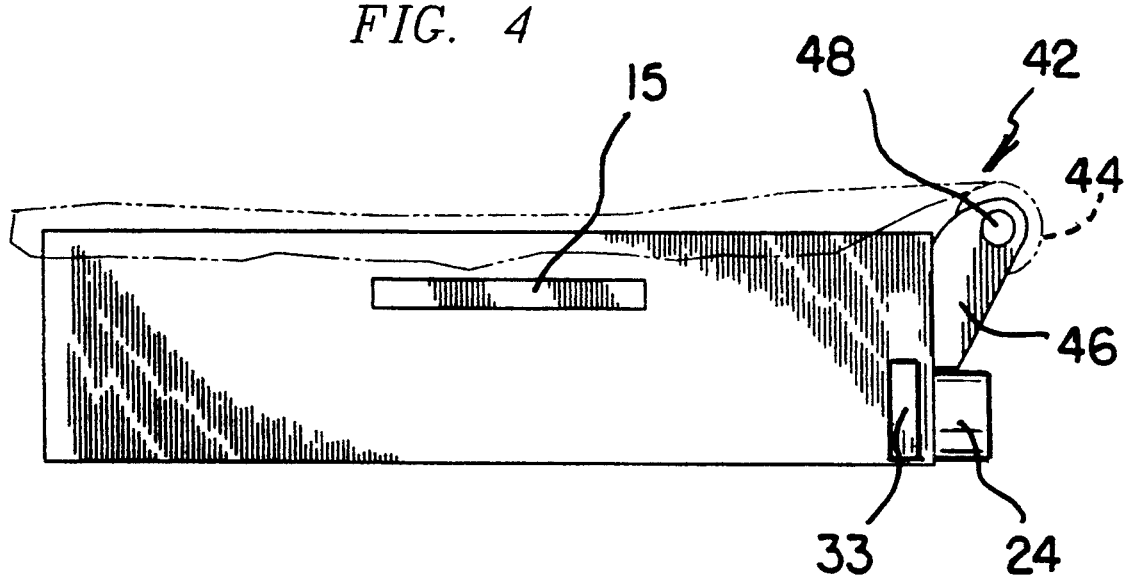
FIG. 4 is a side view of a second preferred embodiment of the invention which includes a roll of disposable film material.
Figure 5:
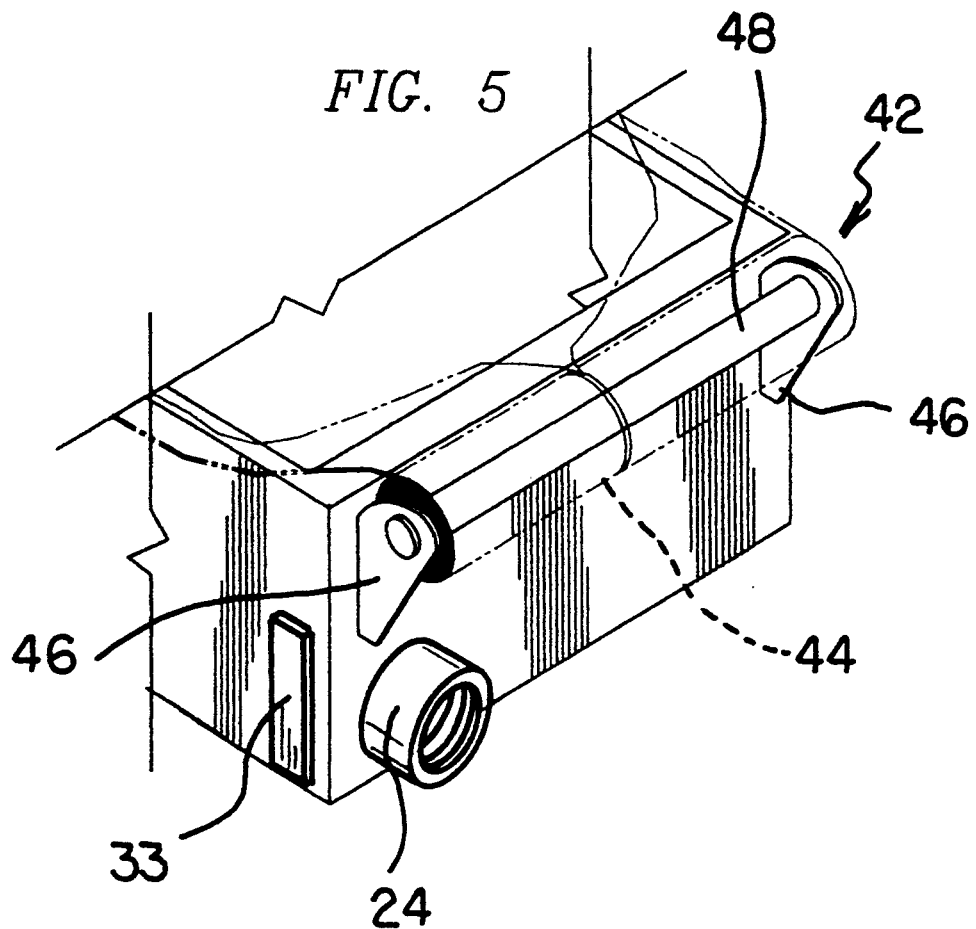
FIG. 5 is a partial perspective view of the embodiment of the invention shown in FIG. 4 showing the roll of disposable film material.

Turning to FIGS. 4-5, a second embodiment of the invention is shown. Reference numerals are shown that correspond to like reference numerals that designate like elements shown in the other figures. In addition, a supply assembly 42 is provided for retaining a roll 44 of film material for providing film material to the container 21. The roll 44 and the film material are shown in broken lines. The supply assembly 42 includes a support bracket assembly 46 supported by one of the four walls. An axle member 48 is supported by the support bracket assembly 46. The axle member 48 supports a roll 44 of film material. The film material on the roll 44 can be payed out onto the floor member 12 before litter material is added to the container 21. In this way, the film material can serve to protect the floor member 12 from soiling by waste materials.

The components of the cat litter box apparatus of the invention can be made from inexpensive and durable plastic materials which are readily washed and cleaned.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved cat litter box apparatus that is low in cost, relatively simple in design and operation, and which may advantageously be used without separating lumps of animal waste from litter granules. With the invention, a cat litter box apparatus is provided which does not have provisions for recycling or reusing waste contaminated cat litter. With the invention, a cat litter box apparatus is provided which is simple, small, and easy to clean. With the invention, a cat litter box apparatus is provided which precludes leaving a residue left by incomplete waste removal by a scraper. With the invention, a cat litter box apparatus is provided which does not dispose of the litter box along with contaminated waste litter. With the invention, a cat litter box apparatus is provided which minimizes the amount of material that is picked up in garbage collection and that is sent to a landfill. With the invention, a cat litter box apparatus is provided which does not employ foldable panels. With the invention, a cat litter box apparatus is provided which is readily closed to retain the waste litter and to confine unpleasant odors to the interior of the closed box. With the invention, a cat litter box apparatus is provided which has a capability of pouring waste litter out of the box in a small volume stream, in contrast with dumping the entire load of litter out of the box at once. With the invention, a cat litter box apparatus is provided which has a spout that can be attached to the litter box to facilitate the transfer of waste litter. With the invention, a cat litter box apparatus is provided which has a spout that can be readily detached from the litter box and stored on the litter box for future use. With the invention, a cat litter box apparatus is provided which includes a handle for carrying the litter box.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the U.S. is as follows:

1. A new and improved cat litter box apparatus, comprising:
   a floor member,
   four walls projecting upward from said floor member, said four walls including a first wall, a second wall, a third wall, and a fourth wall, said four walls and said floor member defining a container for litter,
   a removable and replaceable cover member capable of being fitted onto said four walls for sealing the litter within said container, and
   a discharge outlet located in one said four walls for permitting the litter within said container to be discharged from said container,
   further including:
   a discharge valve assembly for selectively closing or opening said discharge outlet,
   wherein said discharge valve assembly includes:
   a slot in said wall containing said discharge outlet adjacent to said discharge outlet, and
   a valve member, capable of sliding within said slot, and capable of being placed in registration with said discharge outlet, for selectively controlling flow of the litter through said discharge outlet.

2. The apparatus described in claim 1 wherein three of said four walls include grooves and one of said four walls includes a slot for receiving said cover member for sealing the litter within said container.

3. The apparatus described in claim 1, further including:
   a lifting handle attached to one of said four walls for lifting said container.

4. The apparatus described in claim 1, further including:
   a receptacle slot for receiving said cover member when said cover member is not installed on said four walls for sealing the litter within said container.

5. The apparatus described in claim 4 wherein said receptacle slot is located below said floor member.

6. The apparatus described in claim 1, further including:
   a spout member capable of being connected to said discharge outlet for permitting controlled discharge of the litter from said container through said discharge outlet and through said spout member.

7. The apparatus described in claim 6 wherein said spout member includes threads capable of connecting to complementary threads in said discharge outlet.

8. The apparatus described in claim 6, further including:
   a holder assembly, attached to one of said four walls, for holding said spout member when said spout member is not connected to said discharge outlet.

* * * * *